May 18, 1937.  O. ISAAC  2,080,540
PROPELLER
Filed Aug. 22, 1936   3 Sheets-Sheet 1

Inventor
Otto Isaac

By Clarence A. O'Brien
Hyman Berman
Attorneys

May 18, 1937. O. ISAAC 2,080,540
PROPELLER
Filed Aug. 22, 1936 3 Sheets-Sheet 3

Inventor
Otto Isaac

By Clarence A. O'Brien
Hyman Berman
Attorneys

Patented May 18, 1937

2,080,540

UNITED STATES PATENT OFFICE 2,080,540

PROPELLER

Otto Isaac, Ely, Nev.

Application August 22, 1936, Serial No. 97,450

1 Claim. (Cl. 170—163)

The present invention relates to new and useful improvements in propellers particularly for aeroplanes, and has for its primary object to provide, in a manner as hereinafter set forth, a device of this character embodying a novel construction and arrangement through the medium of which the pitch of the blades may be conveniently varied as desired while in flight thereby materially increasing the efficiency of the propeller.

Another very important object of the invention is to provide a propeller of the aforementioned character embodying novel means for mounting the blades in the hub in a manner to permit rotary adjustment of said blades.

Still another very important object of the invention is to provide a variable pitch propeller comprising novel means operable by the pilot or others in the craft for adjusting the blades.

Other objects of the invention are to provide a variable pitch propeller for aircraft which will be comparatively simple in construction, strong, durable, reliable, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1:
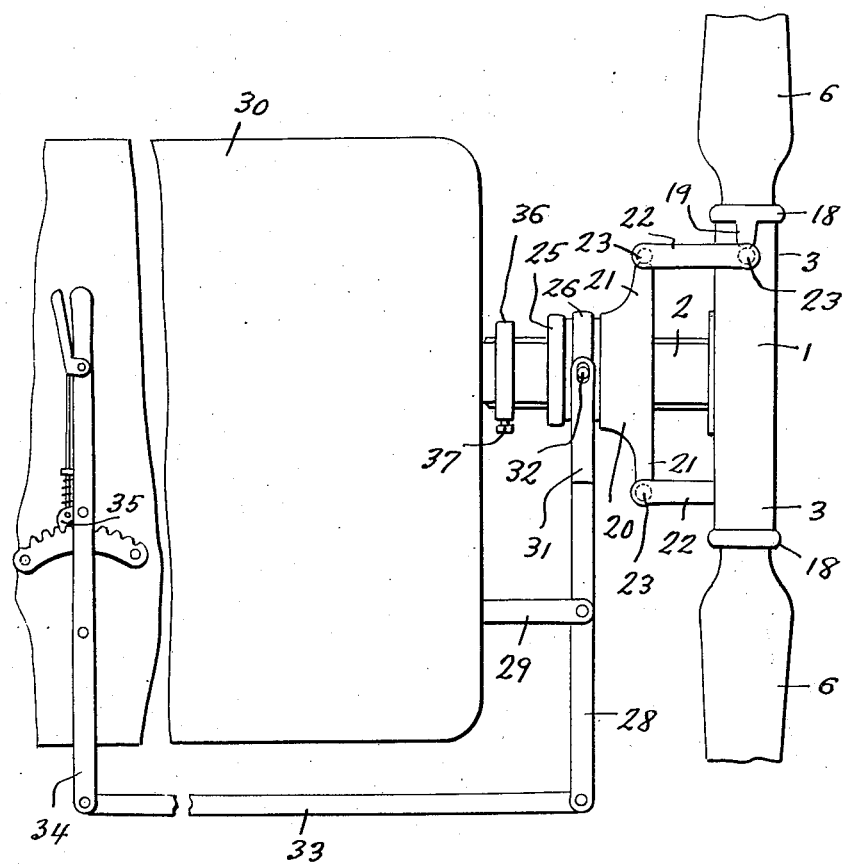
Figure 1 is a view in side elevation of the invention.
Figure 2:
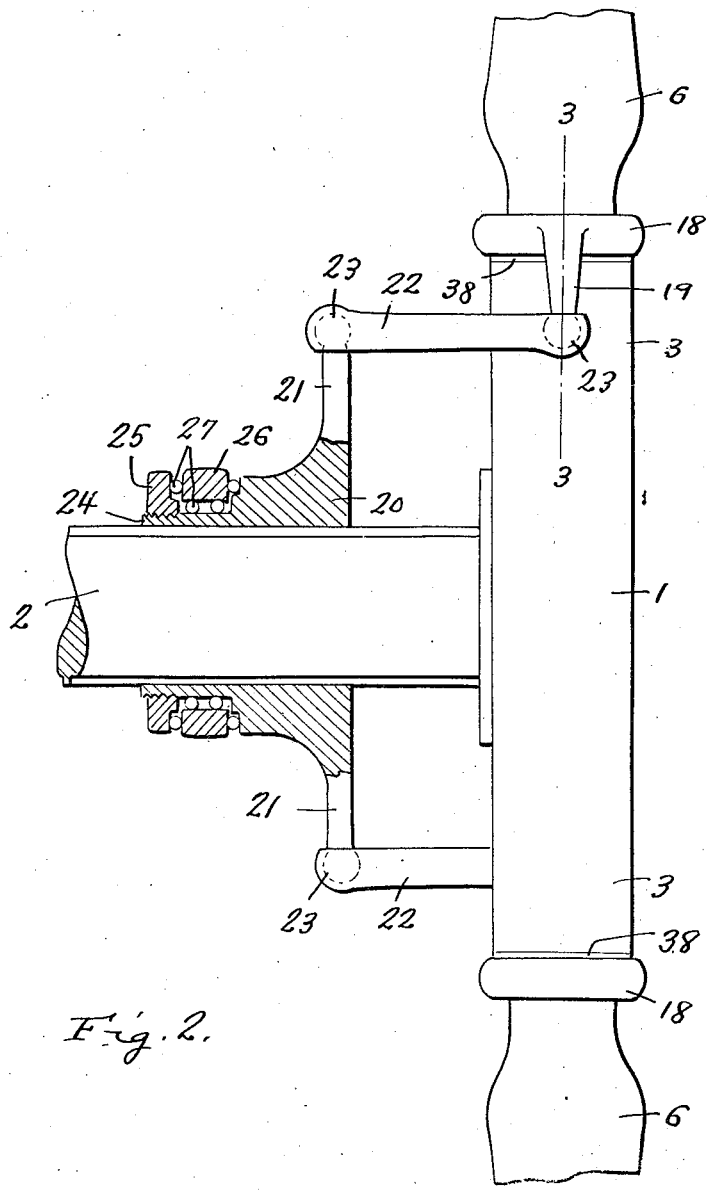
Fig. 2 is a side elevational view on a comparatively large scale, showing the slidable collar and the ring thereon in section.
Figure 3:
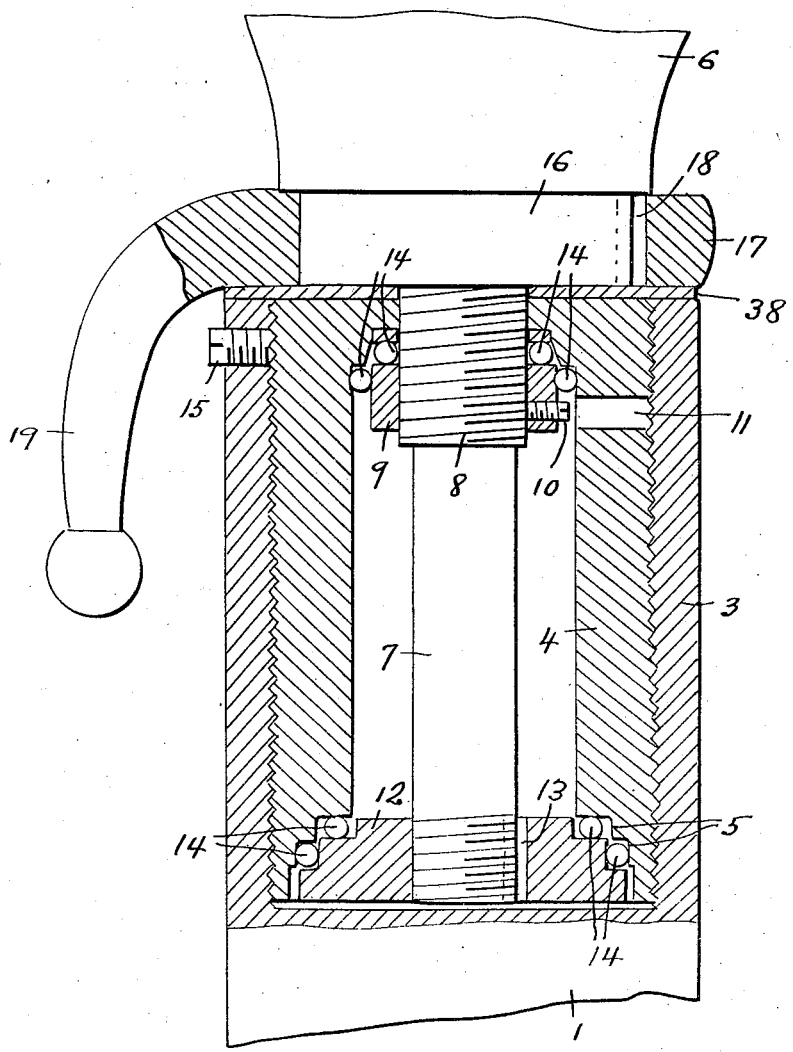
Fig. 3 is a fragmentary view in vertical section, taken on the line 3—3 of Fig. 2.

Referring now to the drawings in detail, it will be seen that the embodiment of the invention which has been illustrated comprises a hub 1 which is fixed on the shaft 2 of the aeroplane engine. Projecting in opposite directions below from the hub 1 are integral sockets 3 which, as illustrated to advantage in Fig. 3 of the drawings, are internally threaded.

Threadedly mounted in the sockets 3 are sleeves 4 the end portions of which are formed to provide the outer portions of races for bearing balls to be presently referred to. Toward this end, the end portions of the sleeves 4 are internally stepped, as at 5.

The reference numeral 6 designates rotatably adjustable blades which project from the hub 1, said blades having fixed on their inner ends shafts 7 which are journalled in the sleeves 4. Adjacent the blades 6, the shafts 7 have formed thereon enlarged threaded portions 8 on which rings 9 are mounted and secured by set screws 10, said rings constituting the inner portions of the ball races in the outer portions of the sleeves 4. Openings 11 are provided in the sleeves 4 to permit access to be had to the set screws 10 with a suitable tool, such as a screw driver. Nuts 12 are threaded on the end portions of the shafts 7 which are remote from the blades 6, said nuts being secured by keys 13. The peripheries of the nuts 12 are stepped in a manner to provide the inner portions of the races in the inner end portions of the sleeves 4. The reference numeral 14 designates ball bearings which are mounted in the races provided by the elements 4, 9, 12, etc. It will be observed that the construction and arrangement is such that combined radial and thrust bearings are provided for the blades 6.

Set screws 15 secure the sleeves 4 in the sockets 3. The inner extremities of the blades 6 are reduced, as at 16, and mounted thereon are rings 17 which are secured by keys 18. Projecting from the rings 17 are inwardly extending arms 19. It will be noted that the arms 19 are located on opposite sides of the hub 1. Splined on the shaft 2 is a collar 20 from which arms 21 project in opposite directions. Links 22 connect the arms 21 to the arms 19. Ball and socket connections 23 are provided between the links 22 and the arms 19 and 21.

The rear end portion of the collar 20 is reduced and threaded as at 24, and mounted thereon is a flange 25. The flange 25, in conjunction with the collar 20, defines an annular channel in which a ring 26 is journalled, ball bearings 27 being provided for said ring. The reference numeral 28 designates a lever which is pivotally mounted at an intermediate point on a suitable bracket 29 on the forward end of the aeroplane 30. The upper end of the lever 28 terminates in a fork 31 having slots therein for the reception of trunnions 32 which project from diametrically opposite sides of the ring 26. A rod 33 connects the other end of the lever 28 to one end of a hand lever 34 which is located within reach of the pilot or other persons in the aeroplane. Suitable means as at 35 is provided for releasably securing the hand lever 34 in adjusted position. A stop ring 36 is adjustably secured on the shaft 2 by a set screw 37 for limiting the rearward movement of the collar 20.

It is thought that the operation of the invention will be readily apparent from a consideration of the foregoing. To vary the pitch of the blades 6, the hand lever 34 is actuated to shift the collar 20 longitudinally on the shaft 2, thereby rotating said blades 6 in the sockets 3 of the hub 1 thru the medium of the arms 19 and 21, the links 22, etc. Of course, the blades 6 are shifted in opposite directions. Bearing plates 38 (see Fig. 3), are interposed between the rings 17 and the outer ends of the sockets 3 and the sleeves 4. The construction and arrangement is such that the blades 6 may be adjusted while in flight in a manner to increase the general efficiency of the propeller.

It is believed that the many advantages of a variable pitch propeller constructed in accordance with the present invention will be readily understood, and although a preferred embodiment of the device has been illustrated and described, it is to be understood that changes in the details of construction and in the combination and arrangement of parts may be resorted to which will fall within the scope of the invention as claimed.

What is claimed is:—

A variable pitch propeller comprising a hub, internally threaded integral sockets projecting in opposite directions from said hub, sleeves threadedly mounted in said sockets, rotatably adjustable blades projecting radially from the sockets, said blades including reduced inner end portions, shafts projecting into the sleeves from the inner ends of the blades, said shafts comprising enlarged threaded portions adjacent the blades and threaded free end portions, the end portions of the sleeves being internally stepped for providing the outer portions of ball races, a ring threaded on the enlarged portion of each shaft, said ring constituting the inner portion of a ball race, a nut threaded on the free end portion of each shaft and having its periphery stepped for providing the inner portion of a ball race at the inner ends of the sleeves, ball bearings interposed between the outer and inner race portions, a ring fixed on the reduced inner portion of each blade, bearing plates interposed between the last named rings and the outer ends of the sockets, arms extending from the last named rings on opposite sides of the hub, and manually operable means connected to said arms for adjusting the blades.

OTTO ISAAC.